United States Patent
Sung et al.

(10) Patent No.: US 10,083,697 B2
(45) Date of Patent: *Sep. 25, 2018

(54) LOCAL PERSISTING OF DATA FOR SELECTIVELY OFFLINE CAPABLE VOICE ACTION IN A VOICE-ENABLED ELECTRONIC DEVICE

(71) Applicant: Google Inc., Mountain View, CA (US)

(72) Inventors: Sangsoo Sung, Palo Alto, CA (US); Yuli Gao, Sunnyvale, CA (US); Prathab Murugesan, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/723,279

(22) Filed: May 27, 2015

(65) Prior Publication Data

US 2016/0351200 A1    Dec. 1, 2016

(51) Int. Cl.
| | | |
|---|---|---|
| *G10L 15/22* | (2006.01) | |
| *G10L 15/02* | (2006.01) | |
| *G10L 15/30* | (2013.01) | |
| *G10L 15/16* | (2006.01) | |
| *G10L 15/187* | (2013.01) | |
| *H04M 3/533* | (2006.01) | |

(Continued)

(52) U.S. Cl.
CPC .............. *G10L 17/22* (2013.01); *G10L 15/30* (2013.01); *H04L 67/42* (2013.01)

(58) Field of Classification Search
CPC ..... G10L 15/265; G10L 15/02; G10L 15/063; G10L 15/187; G10L 15/22; G10L 15/30; G11C 2207/16; G06F 17/289; G06F 17/2785; G06F 17/2735; H04M 3/53325; H04M 3/533; H04M 3/5307
See application file for complete search history.

(56) References Cited

U.S. PATENT DOCUMENTS

| | | |
|---|---|---|
| 5,092,919 A | 3/1992 | Nguyen |
| 5,857,099 A | 1/1999 | Mitchell |

(Continued)

FOREIGN PATENT DOCUMENTS

| | | |
|---|---|---|
| WO | 9416435 A2 | 7/1994 |
| WO | 2006037219 A1 | 4/2006 |

(Continued)

OTHER PUBLICATIONS

International Search Report and Written Opinion of PCT Serial No. PCT/US2016/033658 dated Sep. 26, 2016.

(Continued)

*Primary Examiner* — Anne L Thomas-Homescu
(74) *Attorney, Agent, or Firm* — Middleton Reutlinger

(57) ABSTRACT

Data associated with a selectively offline capable voice action is locally persisted in a voice-enabled electronic device whenever such an action cannot be competed locally due to the device being offline to enable the action to later be completed after online connectivity has been restored. Synchronization with an online service and/or another electronic device, and/or retrieval of context sensitive data from an online service may be performed after online connectivity has been restored to enable the voice action to thereafter be completed.

19 Claims, 6 Drawing Sheets

(51) Int. Cl.
*G10L 17/22* (2013.01)
*H04L 29/06* (2006.01)

(56) References Cited

U.S. PATENT DOCUMENTS

| | | | |
|---|---|---|---|
| 6,421,607 B1* | 7/2002 | Gee | G01C 21/3629 340/988 |
| 6,442,520 B1 | 8/2002 | Buhrke | |
| 6,678,415 B1 | 1/2004 | Popat | |
| 6,751,595 B2* | 6/2004 | Busayapongchai | G10L 15/22 379/88.03 |
| 6,779,030 B1* | 8/2004 | Dugan | H04M 3/42136 379/221.08 |
| 6,856,960 B1* | 2/2005 | Dragosh | G10L 15/30 704/243 |
| 7,197,331 B2* | 3/2007 | Anastasakos | G10L 15/30 455/550.1 |
| 7,233,786 B1* | 6/2007 | Harris | H04L 29/06027 370/328 |
| 7,606,708 B2* | 10/2009 | Hwang | G10L 15/06 704/257 |
| 7,653,191 B1* | 1/2010 | Glasser | H04M 3/42229 379/201.1 |
| 7,689,420 B2* | 3/2010 | Paek | G10L 15/19 704/250 |
| 7,729,913 B1* | 6/2010 | Lee | G06F 17/30654 704/251 |
| 8,195,468 B2* | 6/2012 | Weider | G06F 17/30864 704/233 |
| 8,209,184 B1* | 6/2012 | Dragosh | G10L 15/30 704/231 |
| 8,396,710 B2* | 3/2013 | White | G10L 15/30 704/244 |
| 8,447,607 B2* | 5/2013 | Weider | G06F 17/30864 704/250 |
| 8,494,853 B1 | 7/2013 | Mengibar | |
| 8,868,409 B1 | 10/2014 | Mengibar et al. | |
| 8,949,130 B2* | 2/2015 | Phillips | G10L 15/30 382/190 |
| 9,172,803 B2* | 10/2015 | Bachran | H04M 3/493 |
| 9,460,713 B1 | 10/2016 | Moreno Mengibar et al. | |
| 9,620,122 B2 | 4/2017 | VanBlon | |
| 9,691,390 B2 | 6/2017 | Stonehocker et al. | |
| 9,773,498 B2 | 9/2017 | Stern et al. | |
| 2002/0042707 A1* | 4/2002 | Zhao | G06F 17/27 704/9 |
| 2002/0169600 A1* | 11/2002 | Busayapongchai | G10L 15/22 704/201 |
| 2003/0120493 A1 | 6/2003 | Gupta | |
| 2004/0044516 A1* | 3/2004 | Kennewick | G10L 15/22 704/5 |
| 2005/0027527 A1* | 2/2005 | Junkawitsch | G10L 15/20 704/243 |
| 2005/0043953 A1* | 2/2005 | Winterkamp | G10L 15/22 704/275 |
| 2005/0187771 A1 | 8/2005 | Gong | |
| 2006/0093998 A1* | 5/2006 | Vertegaal | G06F 3/011 434/236 |
| 2007/0142027 A1* | 6/2007 | Bushnell | H04M 3/4874 455/404.1 |
| 2007/0276651 A1 | 11/2007 | Bliss | |
| 2007/0288159 A1* | 12/2007 | Skelton | G01C 15/00 455/556.2 |
| 2009/0030697 A1 | 1/2009 | Cerra et al. | |
| 2009/0053681 A1* | 2/2009 | Shen | G09B 19/06 434/157 |
| 2009/0077191 A1* | 3/2009 | Bristow | H04L 12/5855 709/207 |
| 2009/0119009 A1* | 5/2009 | Dicke | G01C 21/30 701/533 |
| 2009/0187410 A1 | 7/2009 | Wilpon et al. | |
| 2009/0210148 A1* | 8/2009 | Jayanthi | G01C 21/26 701/467 |
| 2009/0220926 A1 | 9/2009 | Rechlis | |
| 2010/0088100 A1* | 4/2010 | Lindahl | G10L 15/30 704/270.1 |
| 2010/0153335 A1* | 6/2010 | Esteve Balducci | G06Q 10/107 707/610 |
| 2010/0158218 A1* | 6/2010 | Dhawan | H04M 1/2478 379/88.18 |
| 2010/0172287 A1* | 7/2010 | Krieter | H04W 8/005 370/328 |
| 2010/0299376 A1* | 11/2010 | Batchu | G06F 21/6245 707/805 |
| 2011/0015928 A1 | 1/2011 | Odell et al. | |
| 2011/0044435 A1* | 2/2011 | Bachran | H04M 3/493 379/88.17 |
| 2011/0112827 A1* | 5/2011 | Kennewick | G10L 15/18 704/9 |
| 2011/0112921 A1* | 5/2011 | Kennewick | G06Q 30/0601 705/26.1 |
| 2011/0286586 A1* | 11/2011 | Saylor | H04M 3/493 379/88.13 |
| 2012/0089698 A1* | 4/2012 | Tseng | G06Q 10/101 709/217 |
| 2012/0179457 A1 | 7/2012 | Newman et al. | |
| 2012/0215539 A1 | 8/2012 | Juneja | |
| 2012/0245934 A1 | 9/2012 | Talwar et al. | |
| 2012/0253799 A1* | 10/2012 | Bangalore | G10L 15/183 704/231 |
| 2013/0030802 A1* | 1/2013 | Jia | G10L 15/06 704/231 |
| 2013/0085753 A1 | 4/2013 | Bringert et al. | |
| 2013/0132089 A1 | 5/2013 | Fanty et al. | |
| 2013/0151250 A1 | 6/2013 | VanBlon | |
| 2013/0179154 A1* | 7/2013 | Okuno | G10L 15/22 704/10 |
| 2013/0246392 A1 | 9/2013 | Farmaner | |
| 2013/0332162 A1* | 12/2013 | Keen | G10L 15/26 704/235 |
| 2014/0025380 A1 | 1/2014 | Koch et al. | |
| 2014/0036022 A1* | 2/2014 | Croen | H04N 7/147 348/14.01 |
| 2014/0039893 A1 | 2/2014 | Weiner | |
| 2014/0053209 A1 | 2/2014 | Young et al. | |
| 2014/0053210 A1 | 2/2014 | Cheong et al. | |
| 2014/0058732 A1* | 2/2014 | Labsky | G10L 15/30 704/254 |
| 2014/0067392 A1 | 3/2014 | Burke | |
| 2014/0088731 A1* | 3/2014 | Von Hauck | H04W 12/06 700/14 |
| 2014/0129226 A1* | 5/2014 | Lee | G10L 15/04 704/254 |
| 2014/0169539 A1* | 6/2014 | Mumick | H04M 3/48 379/88.23 |
| 2014/0180697 A1 | 6/2014 | Torok | |
| 2014/0288936 A1* | 9/2014 | Cho | G10L 15/18 704/257 |
| 2014/0320284 A1* | 10/2014 | Messenger | A61B 5/0022 340/527 |
| 2014/0324745 A1 | 10/2014 | Leppanen et al. | |
| 2014/0337007 A1 | 11/2014 | Waibel et al. | |
| 2014/0358544 A1 | 12/2014 | Printz | |
| 2015/0081630 A1* | 3/2015 | Linsalata | G06F 17/30578 707/617 |
| 2015/0120287 A1* | 4/2015 | Stern | G10L 15/183 704/231 |
| 2015/0120288 A1 | 4/2015 | Thomas | |
| 2015/0120296 A1* | 4/2015 | Stern | G10L 15/30 704/236 |
| 2015/0133082 A1* | 5/2015 | Broch | H04M 1/72577 455/410 |
| 2015/0186892 A1* | 7/2015 | Zhang | G06Q 20/40145 705/44 |
| 2015/0254518 A1* | 9/2015 | Griffin | H04M 1/72552 382/229 |
| 2015/0255068 A1* | 9/2015 | Kim | G10L 17/04 704/246 |
| 2015/0279352 A1 | 10/2015 | Willett | |

(56) References Cited

U.S. PATENT DOCUMENTS

| | | | |
|---|---|---|---|
| 2015/0293509 A1* | 10/2015 | Bankowski | G05B 15/02 |
| | | | 700/275 |
| 2015/0370787 A1 | 12/2015 | Akbacak | |
| 2015/0371628 A1 | 12/2015 | Kreifeldt | |
| 2015/0373183 A1* | 12/2015 | Woolsey | H04M 1/72563 |
| | | | 348/14.08 |
| 2015/0379987 A1 | 12/2015 | Panainte et al. | |
| 2016/0027435 A1 | 1/2016 | Pinto et al. | |
| 2016/0042748 A1 | 2/2016 | Jain | |
| 2016/0328270 A1 | 11/2016 | Bikkula et al. | |
| 2016/0350320 A1 | 12/2016 | Sung et al. | |
| 2017/0256264 A1 | 9/2017 | Stonehocker et al. | |

FOREIGN PATENT DOCUMENTS

| | | |
|---|---|---|
| WO | 2009082684 A1 | 7/2009 |
| WO | 2009145796 A1 | 12/2009 |
| WO | 2014055076 A1 | 4/2014 |
| WO | 2014060054 A1 | 4/2014 |
| WO | 2014144579 A1 | 9/2014 |
| WO | 2015041892 A1 | 3/2015 |

OTHER PUBLICATIONS

Kumar Anuj et al., "Enabling the Rapid Development and Adoption of Speech-User Interfaces," Computer, IEEE, US, vol. 47, No. 1, Jan. 1, 2014, pp. 40-47.

Kuhn T. et al., "Hybrid in-car speech recognition for mobile multimedia applications," Vehicular Technology Conference, 1999 IEEE, May 20, 1999.

\* cited by examiner

LOCAL PERSISTING OF DATA FOR SELECTIVELY OFFLINE CAPABLE VOICE ACTION IN A VOICE-ENABLED ELECTRONIC DEVICE

BACKGROUND

Voice-based user interfaces are increasingly being used in the control of computers and other electronic devices. One particularly useful application of a voice-based user interface is with portable electronic devices such as mobile phones, watches, tablet computers, head-mounted devices, virtual or augmented reality devices, etc. Another useful application is with vehicular electronic systems such as automotive systems that incorporate navigation and audio capabilities. Such applications are generally characterized by non-traditional form factors that limit the utility of more traditional keyboard or touch screen inputs and/or usage in situations where it is desirable to encourage a user to remain focused on other tasks, such as when the user is driving or walking.

Voice-based user interfaces have continued to evolve from early rudimentary interfaces that could only understand simple and direct commands to more sophisticated interfaces that respond to natural language requests and that can understand context and manage back-and-forth dialogs or conversations with users. Many voice-based user interfaces incorporate both an initial speech-to-text (or voice-to-text) conversion that converts an audio recording of a human voice to text, and a semantic analysis that analysis the text in an attempt to determine the meaning of a user's request. Based upon a determined meaning of a user's recorded voice, an action may be undertaken such as performing a search or otherwise controlling a computer or other electronic device.

The computing resource requirements of a voice-based user interface, e.g., in terms of processor and/or memory resources, can be substantial, and as a result, some conventional voice-based user interface approaches employ a client-server architecture where voice input is received and recorded by a relatively low-power client device, the recording is transmitted over a network such as the Internet to an online service for speech-to-text conversion and semantic processing, and an appropriate response is generated by the online service and transmitted back to the client device. Online services can devote substantial computing resources to processing voice input, enabling more complex speech recognition and semantic analysis functionality to be implemented than could otherwise be implemented locally within a client device. However, a client-server approach necessarily requires that a client be online (i.e., in communication with the online service) when processing voice input. Particularly in mobile and automotive applications, continuous online connectivity may not be guaranteed at all times and in all locations, so a client-server voice-based user interface may be disabled in a client device whenever that device is "offline" and thus unconnected to an online service. Furthermore, even when a device is connected to an online service, the latency associated with online processing of a voice input, given the need for bidirectional communications between the client device and the online service, may be undesirably perceptible by a user. As such, some devices may incorporate offline or local processing functionality for processing voice inputs.

SUMMARY

This specification is directed generally to various implementations that locally persist data associated with a particular type of voice action, referred to herein as a selectively offline capable voice action, in a voice-enabled electronic device whenever such an action cannot be competed locally due to the device being offline to enable the action to later be completed after online connectivity has been restored. A selectively offline capable voice action, as will be discussed in greater detail below, is a type of voice action that in some instances can be completed when a voice-enabled electronic device is online, but in other instances can only be completed using a connection with an online service, and the persisting of data associated with such actions enables operations such as synchronization with an online service and/or another electronic device, and/or retrieval of context sensitive data from an online service, to be performed after online connectivity has been restored to enable the voice action to thereafter be completed.

Therefore, in some implementations, a method may receive a voice input with a voice-enabled electronic device, and in the voice-enabled electronic device, and responsive to receiving at least a portion of the voice input, perform local processing of the at least a portion of the voice input to build at least a portion of a selectively offline capable voice action, where the selectively offline capable voice action is of a type that in at least one instance is capable of being completed offline and in at least one other instance can only be completed using a connection with an online service, determine during the local processing and when the voice-enabled electronic device is offline whether the selectively offline capable voice action can be completed offline, and in response to determining that the selectively offline capable voice action can be completed offline, complete the selectively offline capable voice action with the local processing. Further, in response to determining that the selectively offline capable voice action cannot be completed offline, the method may locally persist data generated by the local processing for the selectively offline capable voice action, and complete the selectively offline capable voice action using the locally persisted data after the voice-enabled electronic device is connected with the online service.

In some implementations, the voice-enabled electronic device comprises a mobile device configured to communicate with the online service when in communication with a wireless network, and in some implementations, performing the local processing dynamically builds the at least a portion of the offline capable voice action prior to completely receiving the voice input with the voice-enabled electronic device, and determining during the local processing and when the voice-enabled electronic device is offline whether the selectively offline capable voice action can be completed offline is performed prior to completely receiving the voice input with the voice-enabled electronic device.

In addition, in some implementations, completing the selectively offline capable voice action using the locally persisted data after the voice-enabled electronic device is connected with the online service includes retrieving context sensitive data from the online service and completing the selectively offline capable voice action using the context sensitive data. Further, in some implementations, completing the selectively offline capable voice action using the locally persisted data after the voice-enabled electronic device is connected with the online service includes issuing a query to the online service for the context sensitive data, and in some implementations, the offline capable voice action includes at least one location sensitive parameter, the query includes a current location of the voice-enabled electronic device, and the context sensitive data includes location sensitive data. In some implementations, the offline capable voice action includes at least one parameter that remains unresolved based upon the voice input, and retrieving the context sensitive data from the online service includes retrieving a value for the at least one parameter from the online service.

Also in some implementations, completing the selectively offline capable voice action using the locally persisted data after the voice-enabled electronic device is connected with the online service includes synchronizing the voice-enabled electronic device with the online service. In some implementations, completing the selectively offline capable voice action using the locally persisted data after the voice-enabled electronic device is connected with the online service includes synchronizing the voice-enabled electronic device with at least one other electronic device associated with the user of the voice-enabled electronic device.

In addition, in some implementations, locally persisting data generated by the local processing for the selectively offline capable voice action includes locally persisting diagnostic data associated with the selectively offline capable voice action, and completing the selectively offline capable voice action using the locally persisted data after the voice-enabled electronic device is connected with the online service includes uploading the diagnostic data associated with the selectively offline capable voice action.

Some implementations also, in response to determining that the selectively offline capable voice action cannot be completed offline, perform a local completion of the selectively offline capable voice action on the voice-enabled electronic device, and completing the selectively offline capable voice action using the locally persisted data after the voice-enabled electronic device is connected with the online service includes performing a remote completion of the selectively-offline capable voice action with the online service. Some implementations also include, in response to determining that the selectively offline capable voice action cannot be completed offline, notifying a user of the voice-enabled electronic device that the selectively offline capable voice action will be completed after the voice-enabled electronic device is connected with the online service, and some implementations further include, in response to determining that the selectively offline capable voice action cannot be completed offline, notifying the user of the voice-enabled electronic device that the selectively offline capable voice action has been completed after the voice-enabled electronic device has connected with the online service. In addition, in some implementations, the type of the selectively offline capable voice action is selected from the group consisting of a reminder type, a communication type, an event type, a device setting type, a media control type and a navigation type.

In addition, some implementations may include an apparatus including memory and one or more processors operable to execute instructions stored in the memory, where the instructions are configured to perform any of the aforementioned methods. Some implementations may also include a non-transitory computer readable storage medium storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

In the implementations discussed hereinafter, data associated with a selectively offline capable voice action is locally persisted in a voice-enabled electronic device whenever such an action cannot be competed locally due to the device being offline to enable the action to later be completed after online connectivity has been restored. Further details regarding selected implementations are discussed hereinafter. It will be appreciated however that other implementations are contemplated so the implementations disclosed herein are not exclusive.

Example Hardware and Software Environment

Figure 1:
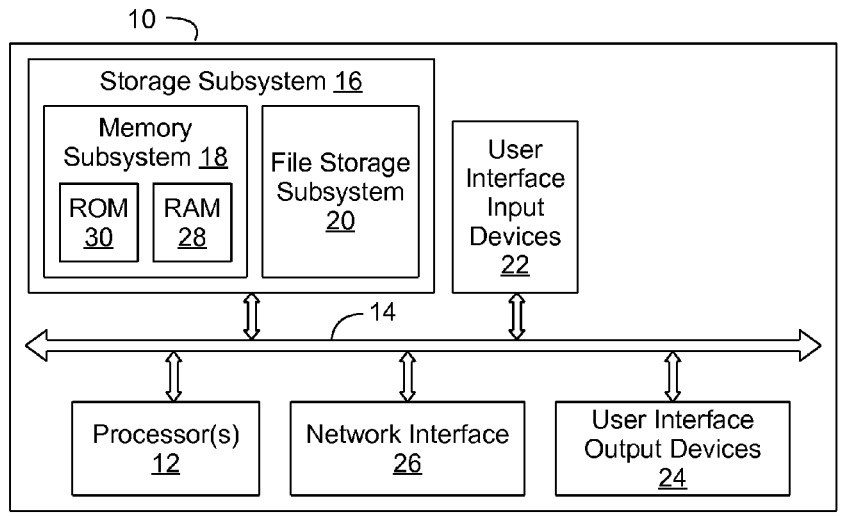
FIG. 1 illustrates an example architecture of a computer system.

Now turning to the Drawings, wherein like numbers denote like parts throughout the several views, FIG. 1 is a block diagram of electronic components in an example computer system 10. System 10 typically includes at least one processor 12 that communicates with a number of peripheral devices via bus subsystem 14. These peripheral devices may include a storage subsystem 16, including, for example, a memory subsystem 18 and a file storage subsystem 20, user interface input devices 22, user interface output devices 24, and a network interface subsystem 26. The input and output devices allow user interaction with system 10. Network interface subsystem 26 provides an interface to outside networks and is coupled to corresponding interface devices in other computer systems.

In some implementations, user interface input devices 22 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 10 or onto a communication network.

User interface output devices 24 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 10 to the user or to another machine or computer system.

Storage subsystem 16 stores programming and data constructs that provide the functionality of some or all of the modules described herein. For example, the storage subsystem 16 may include the logic to perform selected aspects of the methods disclosed hereinafter.

These software modules are generally executed by processor 12 alone or in combination with other processors. Memory subsystem 18 used in storage subsystem 16 may include a number of memories including a main random access memory (RAM) 28 for storage of instructions and data during program execution and a read only memory (ROM) 30 in which fixed instructions are stored. A file storage subsystem 20 may provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 20 in the storage subsystem 16, or in other machines accessible by the processor(s) 12.

Bus subsystem 14 provides a mechanism for allowing the various components and subsystems of system 10 to communicate with each other as intended. Although bus subsystem 14 is shown schematically as a single bus, alternative implementations of the bus subsystem may use multiple busses.

System 10 may be of varying types including a mobile device, a portable electronic device, an embedded device, a desktop computer, a laptop computer, a tablet computer, a wearable device, a workstation, a server, a computing cluster, a blade server, a server farm, or any other data processing system or computing device. In addition, functionality implemented by system 10 may be distributed among multiple systems interconnected with one another over one or more networks, e.g., in a client-server, peer-to-peer, or other networking arrangement. Due to the ever-changing nature of computers and networks, the description of system 10 depicted in FIG. 1 is intended only as a specific example for purposes of illustrating some implementations. Many other configurations of system 10 are possible having more or fewer components than the computer system depicted in FIG. 1.

Implementations discussed hereinafter may include one or more methods implementing various combinations of the functionality disclosed herein. Other implementations may include a non-transitory computer readable storage medium storing instructions executable by a processor to perform a method such as one or more of the methods described herein. Still other implementations may include an apparatus including memory and one or more processors operable to execute instructions, stored in the memory, to perform a method such as one or more of the methods described herein.

Various program code described hereinafter may be identified based upon the application within which it is implemented in a specific implementation. However, it should be appreciated that any particular program nomenclature that follows is used merely for convenience. Furthermore, given the endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that some implementations may not be limited to the specific organization and allocation of program functionality described herein.

Furthermore, it will be appreciated that the various operations described herein that may be performed by any program code, or performed in any routines, workflows, or the like, may be combined, split, reordered, omitted, performed sequentially or in parallel and/or supplemented with other techniques, and therefore, some implementations are not limited to the particular sequences of operations described herein.

Distributed Voice Input Processing Environment

Figure 2:
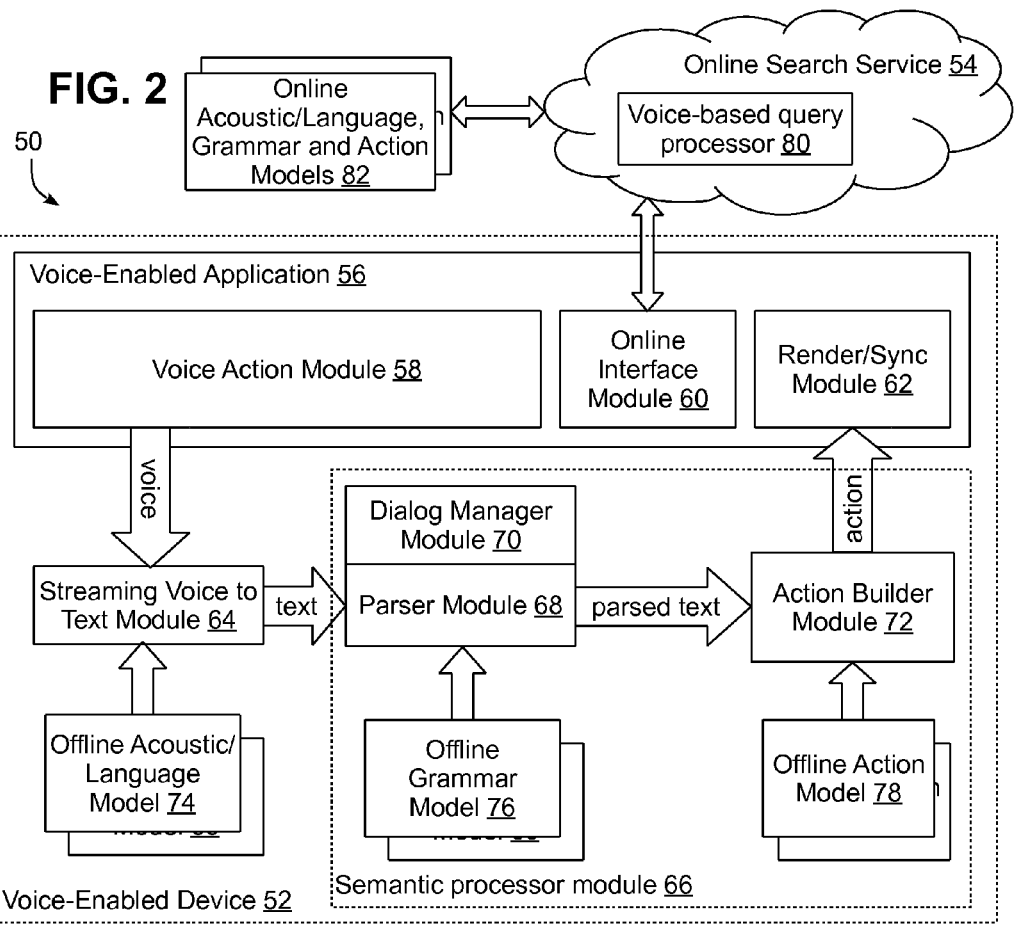
FIG. 2 is a block diagram of an example distributed voice input processing environment.

FIG. 2 illustrates an example distributed voice input processing environment 50, e.g., for use with a voice-enabled device 52 in communication with an online service such as online search service 54. In the implementations discussed hereinafter, for example, voice-enabled device 52 (also referred to herein as a voice-enabled electronic device) is described as a mobile device such as a cellular phone or tablet computer. Other implementations may utilize a wide variety of other voice-enabled devices, however, so the references hereinafter to mobile devices are merely for the purpose of simplifying the discussion hereinafter. Countless other types of voice-enabled devices may use the herein-described functionality, including, for example, laptop computers, watches, head-mounted devices, virtual or augmented reality devices, other wearable devices, audio/video systems, navigation systems, automotive and other vehicular systems, etc. Moreover, many of such voice-enabled devices may be considered to be resource-constrained in that the memory and/or processing capacities of such devices may be constrained based upon technological, economic or other reasons, particularly when compared with the capacities of online or cloud-based services that can devote virtually unlimited computing resources to individual tasks. Some such devices may also be considered to be offline devices to the extent that such devices may be capable of operating "offline" and unconnected to an online service at least a portion of time, e.g., based upon an expectation that such devices may experience temporary network connectivity outages from time to time under ordinary usage.

Online search service 54 in some implementations may be implemented as a cloud-based service employing a cloud infrastructure, e.g., using a server farm or cluster of high performance computers running software suitable for handling high volumes of requests from multiple users. In the illustrated implementation, online search service 54 is capable of querying one or more databases to locate requested information, e.g., to provide a list of web sites including requested information. Online search service 54 may not be limited to voice-based searches, and may also be capable of handling other types of searches, e.g., text-based searches, image-based searches, etc. In other implementations, an online system need not necessarily handle searching, and may be limited to handling voice-based requests for non-search actions such as setting alarms or reminders, managing lists, initiating communications with other users via phone, text, email, etc., or performing other actions that may be initiated via voice input. For the purposes of this disclosure, voice-based requests and other forms of voice input may be collectively referred to as voice-based queries, regardless of whether the voice-based queries seek to initiate a search, pose a question, issue a command, etc. In general, therefore, any voice input, e.g., including one or more words or phrases, may be considered to be a voice-based query within the context of the illustrated implementations.

In the implementation of FIG. 2, voice input received by voice-enabled device 52 is processed by a voice-enabled application (or "app") 56, which in some implementations may be a search application. In other implementations, voice input may be handled within an operating system or firmware of a voice-enabled device. Application 56 in the illustrated implementation includes a voice action module 58, online interface module 60 and render/synchronization module 62. Voice action module 58 receives voice input directed to the application and coordinates the analysis of the voice input and performance of one or more actions for a user of the voice-enabled device 52. Online interface module 60 provides an interface with online search service 54, including forwarding voice input to service 54 and receiving responses thereto. Render/synchronization module 62 manages the rendering of a response to a user, e.g., via a visual display, spoken audio, or other feedback interface suitable for a particular voice-enabled device. In addition, in some implementations, module 62 also handles synchronization with online search service 54, e.g., whenever a response or action affects data maintained for the user in the online search service (e.g., where voice input requests creation of an appointment that is maintained in a cloud-based calendar).

Application 56 relies on various middleware, framework, operating system and/or firmware modules to handle voice input, including, for example, a streaming voice to text module 64 and a semantic processor module 66 including a parser module 68, dialog manager module 70 and action builder module 72.

Module 64 receives an audio recording of voice input, e.g., in the form of digital audio data, and converts the digital audio data into one or more text words or phrases (also referred to herein as tokens). In the illustrated implementation, module 64 is also a streaming module, such that voice input is converted to text on a token-by-token basis and in real time or near-real time, such that tokens may be output from module 64 effectively concurrently with a user's speech, and thus prior to a user enunciating a complete spoken request. Module 64 may rely on one or more locally-stored offline acoustic and/or language models 74, which together model a relationship between an audio signal and phonetic units in a language, along with word sequences in the language. In some implementations, a single model 74 may be used, while in other implementations, multiple models may be supported, e.g., to support multiple languages, multiple speakers, etc.

Whereas module 64 converts speech to text, module 66 attempts to discern the semantics or meaning of the text output by module 64 for the purpose or formulating an appropriate response. Parser module 68, for example, relies on one or more offline grammar models 76 to map text to particular actions and to identify attributes that constrain the performance of such actions, e.g., input variables to such actions. In some implementations, a single model 76 may be used, while in other implementations, multiple models may be supported, e.g., to support different actions or action domains (i.e., collections of related actions such as communication-related actions, search-related actions, audio/visual-related actions, calendar-related actions, device control-related actions, etc.)

As an example, an offline grammar model 76 may support an action such as "set a reminder" having a reminder type parameter that specifies what type of reminder to set, an item parameter that specifies one or more items associated with the reminder, and a time parameter that specifies a time to activate the reminder and remind the user. Parser module 64 may receive a sequence of tokens such as "remind me to," "pick up," "bread," and "after work" and map the sequence of tokens to the action of setting a reminder with the reminder type parameter set to "shopping reminder," the item parameter set to "bread" and the time parameter of "5:00 pm,", such that at 5:00 pm that day the user receives a reminder to "buy bread."

Parser module 68 may also work in conjunction with a dialog manager module 70 that manages a dialog with a user. A dialog, within this context, refers to a set of voice inputs and responses similar to a conversation between two individuals. Module 70 therefore maintains a "state" of a dialog to enable information obtained from a user in a prior voice input to be used when handling subsequent voice inputs. Thus, for example, if a user were to say "remind me to pick up bread," a response could be generated to say "ok, when would you like to be reminded?" so that a subsequent voice input of "after work" would be tied back to the original request to create the reminder.

Action builder module 72 receives the parsed text from parser module 68, representing a voice input interpretation and generates an action along with any associated parameters for processing by module 62 of voice-enabled application 56. Action builder module 72 may rely on one or more offline action models 78 that incorporate various rules for creating actions from parsed text. In some implementations, for example, actions may be defined as functions F such that $F(I_T)=A_u$, where T represents the type of the input interpretation and U represents the type of output action. F may therefore include a plurality of input pairs (T, U) that are mapped to one another, e.g., as $f(i_t)=a_u$, where $i_t$ is an input proto variable of type t, and $a_u$ is an output modular argument or parameter of type u. It will be appreciated that some parameters may be directly received as voice input, while some parameters may be determined in other manners, e.g., based upon a user's location, demographic information, or based upon other information particular to a user. For example, if a user were to say "remind me to pick up bread at the grocery store," a location parameter may not be determinable without additional information such as the user's current location, the user's known route between work and home, the user's regular grocery store, etc.

It will be appreciated that in some implementations models 74, 76 and 78 may be combined into fewer models or split into additional models, as may be functionality of modules 64, 68, 70 and 72. Moreover, models 74-78 are referred to herein as offline models insofar as the models are stored locally on voice-enabled device 52 and are thus accessible offline, when device 52 is not in communication with online search service 54.

Furthermore, online search service 54 generally includes complementary functionality for handling voice input, e.g., using a voice-based query processor 80 that relies on various acoustic/language, grammar and/or action models 82. It will be appreciated that in some implementations, particularly when voice-enabled device 52 is a resource-constrained device, voice-based query processor 80 and models 82 used thereby may implement more complex and computationally resource-intensive voice processing functionality than is local to voice-enabled device 52. In other implementations, however, no complementary online functionality may be used.

In some implementations, both online and offline functionality may be supported, e.g., such that online functionality is used whenever a device is in communication with an online service, while offline functionality is used when no connectivity exists. In other implementations different actions or action domains may be allocated to online and offline functionality, and while in still other implementations, online functionality may be used only when offline functionality fails to adequately handle a particular voice input.

Figure 3:
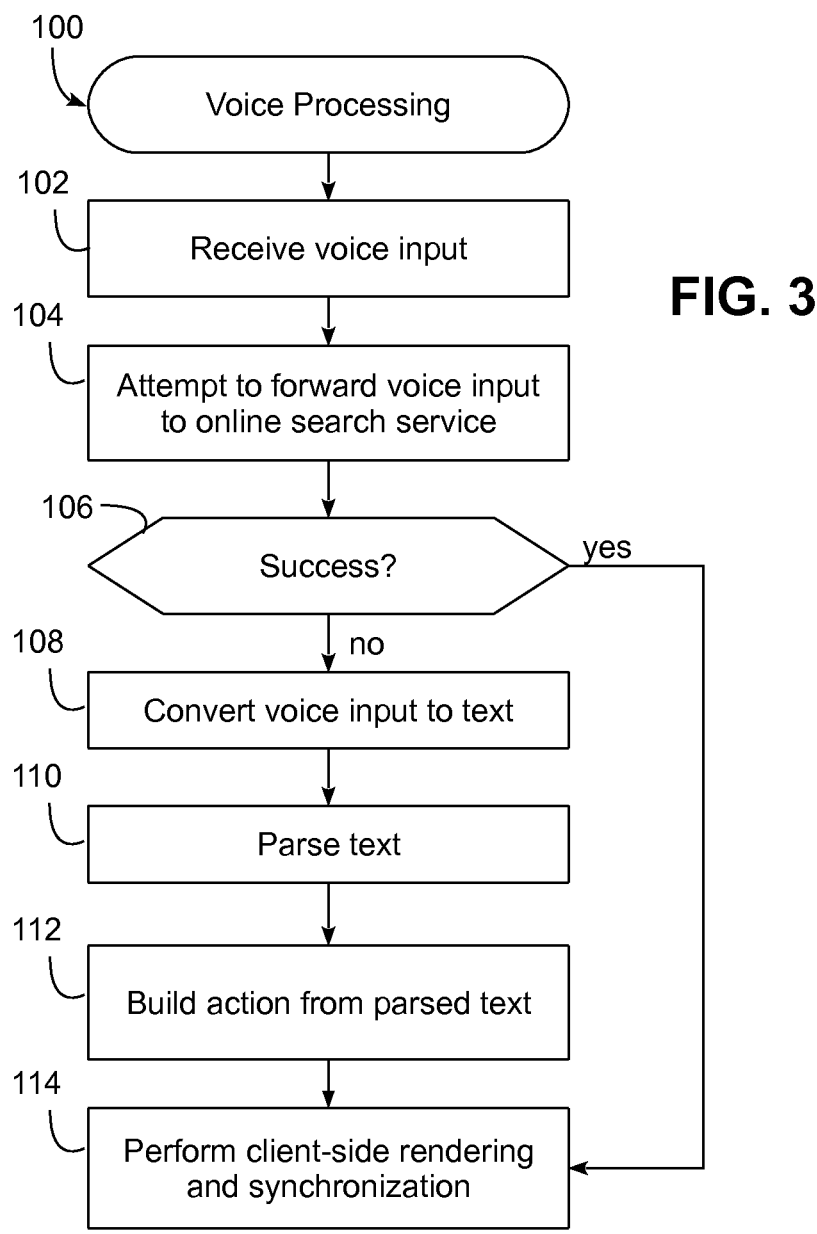
FIG. 3 is a flowchart illustrating an example method of processing a voice input using the environment of FIG. 2.

FIG. 3, for example, illustrates a voice processing routine 100 that may be executed by voice-enabled device 52 to handle a voice input. Routine 100 begins in block 102 by receiving voice input, e.g., in the form of a digital audio signal. In this implementation, an initial attempt is made to forward the voice input to the online search service (block 104). If unsuccessful, e.g., due to the lack of connectivity or the lack of a response from the online search service, block 106 passes control to block 108 to convert the voice input to text tokens (block 108, e.g., using module 64 of FIG. 2), parse the text tokens (block 110, e.g., using module 68 of FIG. 2), and build an action from the parsed text (block 112, e.g., using module 72 of FIG. 2). The resulting action is then used to perform client-side rendering and synchronization (block 114, e.g., using module 62 of FIG. 2), and processing of the voice input is complete.

Returning to block 106, if the attempt to forward the voice input to the online search service is successful, block 106 bypasses blocks 108-112 and passes control directly to block 114 to perform client-side rendering and synchronization. Processing of the voice input is then complete. It will be appreciated that in other implementations, as noted above, offline processing may be attempted prior to online processing, e.g., to avoid unnecessary data communications when a voice input can be handled locally.

Local Persisting of Data for Selectively Offline Capable Voice Action in a Voice-Enabled Electronic Device Voice-enabled electronic devices may rely to different extents on online and offline functionality to implement a voice-based user interface. Some devices, for example, may prioritize the use of online services to perform many of the operations associated with processing voice input, in part because online voice-based query processors are generally capable of devoting comparatively greater processing resources to handle voice-based queries. One of the functions that may be performed by an online service is semantic processing, which processes text elements (also referred to as tokens) generated from digital audio data to attempt to determine an action that is being requested by a user via a voice-based query. In some instances, a digital audio signal may even be provided to an online service such that both semantic processing and voice to text conversion are performed in remotely from the device.

Due to the potential for connectivity issues with such devices, as well as the general latency that may be experienced even when connectivity issues are not present, it may also be desirable in some instances to incorporate local or offline processing functionality, including both voice to text and semantic processing functionality, within a voice-enabled electronic device. In some instances, voice inputs may still be forwarded to an online service whenever a connection exists, and the results of the online service may be used whenever connectivity is present, leaving local processing serving primarily in a backup role, and handling voice inputs only in circumstances where no network connectivity exists. Voice-enabled electronic devices in some implementations may also incorporate streaming architectures that dynamically build actions from voice inputs as users speak, rather than waiting until a complete voice input has been received before attempting to derive a meaning from the voice input, resulting in voice actions that are at least partially-built even prior to a user completely speaking a voice input.

In the implementations discussed hereinafter, local or offline functionality for implementing a voice-based user interface in a voice-enabled electronic device may attempt to address issues that arise due to the need to handle voice inputs irrespective of connectivity to an online service by attempting to locally handle certain voice actions that can be processed without online connectivity while deferring processing of certain voice actions that cannot be processed without online connectivity. In connection with deferring processing, however, data associated with such actions may also be locally persisted to enable such actions to be automatically completed when online connectivity is re-established.

In particular, in some implementations data associated with a particular category of voice actions referred to herein as "selectively offline capable voice actions" is locally persisted when a voice-enabled electronic device such as a mobile device is offline to enable those actions to be automatically completed when connectivity is re-established for the device. A "selectively offline capable voice action," within the context of the disclosure, may be considered to be a voice action that in one or more instances can be completed offline and with no online connectivity, while in one or more other instances requires connectivity to an online service in order to be completed. The term "selectively offline capable voice action" is used herein to distinguish from purely offline actions, which never require online connectivity, and purely online actions that always require online connectivity.

Examples of selectively offline capable voice actions include but are not limited to actions such as reminder type actions, communication type actions, event type actions, device setting type actions, media control type actions, navigation type actions, etc. Such actions in some implementations may be selectively offline capable based upon one or more ambiguities resulting from a voice input, e.g., as a result of one or more parameters for an action being unresolvable strictly based upon data provided in the voice input and/or data available locally on a voice-enabled electronic device. In such instances, context sensitive data may be needed from an online service, e.g., data regarding one or more parameters, and/or data regarding the resolution of ambiguities in a voice input, and completion of such an action may need one or more queries to an online service. In some implementations, a query may incorporate a current location of a voice-enabled electronic device such that location sensitive data may be retrieved for one or more location sensitive parameters associated with an action. Also, in some implementations, a query may retrieve a value for at least one unresolved parameter associated with an action.

As one example, a reminder type action might be triggered in one instance by a request to "set a reminder to call my mom at one o'clock tomorrow," as well as in another instance by a request to "remind me to pick up milk." In the former instance, all of the parameters needed to create a reminder from this voice input may be resolved offline and without any online assistance, as the time and date of the reminder is known from the voice input (1:00 pm on the next day after the current date stored in the device), the text of the reminder may be generated directly from the voice input ("call my mom"), and even a contact number to call may be generated from local data (the locally-stored contact for the individual having a "mother" relationship to the user).

In the latter instance, however, the text of the reminder may be generated directly from the voice input ("pick up milk"), but other parameters may not be ascertainable locally in all circumstances. For example, in some implementations the request may be processed as a location-based reminder that notifies a user whenever the user's device is located within a certain distance from a particular location. The location to set on the reminder, however, may require online assistance in order to be determined. For example, the location may be set to the location of a particular grocery store, e.g., close to the device's current location, close to the user's home, close to a route between the device's current location and the user's home, etc. The grocery store may also be selected based upon purchase history or other demographic information of the user, or even a grocery store currently running a sale on milk. For much of this information online data and/or analytics may be used to generate the location, and consequently, if the voice-enabled electronic device is not currently online when the voice input is received, completion of the requested voice action cannot be completed.

Selectively offline capable voice actions may also in some implementations be selectively offline capable based upon a need to upload data to an online service, and/or a need to synchronize with an online service and/or one or more other voice-enabled electronic devices. For example, creation of an event or a reminder for an online or cloud-based calendar service may involve synchronization of a locally-created event or reminder, and as such, in some implementations when a device is offline, creation of the event or reminder may not be considered to be fully completed until connectivity is re-established.

Within the context of the disclosure, "completing" an action may therefore refer to performing those steps and/or operations that are requested by a user via a voice input. Completing an action may also include completing the construction of a voice action object and performing the action specified by the voice action object. In some instances, completion of an action may occur only locally (referred to herein as a local completion), and in some instances, completion of an action may also occur remotely (referred to herein as a remote completion), e.g., in the online service and/or in one or more other devices associated with the user's voice-enabled electronic device, as might be the case where a user has several devices linked to the same account. In some instances, a local completion may be accompanied by a later synchronization with an online service, e.g., where a reminder or event is created locally on a user's device, and is later synchronized with an online calendar account. In such an instance, the creation of the reminder on the device may still be considered to represent completion of the action even though later synchronization occurs. In other implementations, completing an action may include fully building a voice action object and returning the completed voice action object to another module in a voice-enabled electronic device for further handling.

Figure 4:
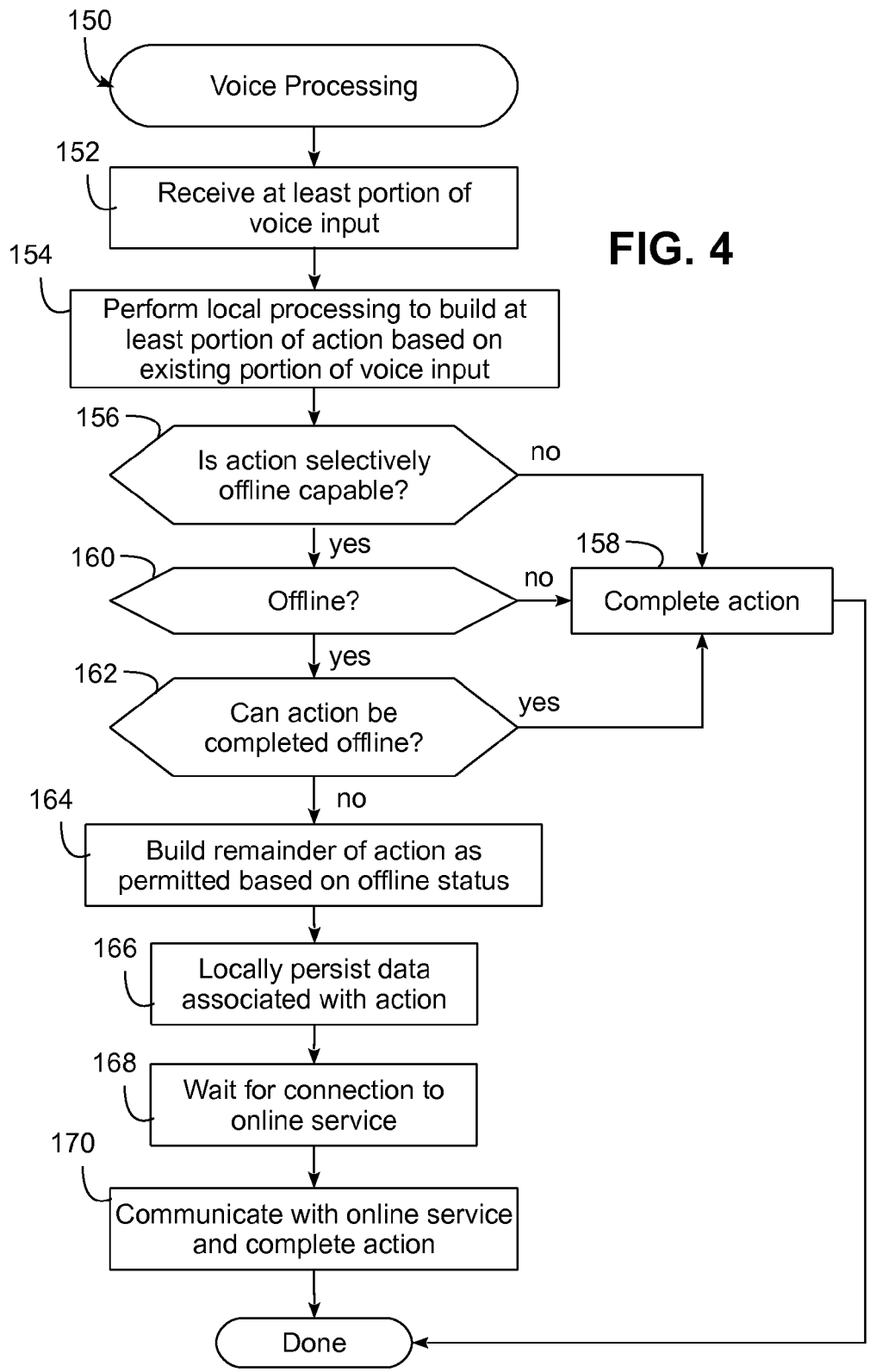
FIG. 4 is a flowchart illustrating an example method of processing a voice input using the environment of FIG. 2.

Now turning to FIG. 4, the figure illustrates one example implementation of a voice processing routine 150 for use in processing selectively offline capable voice actions in the environment of FIG. 2. In this implementation, in block 152 at least a portion of a voice input (e.g., a digital audio signal representative of at least a portion of a spoken question or command) is received by a voice-enabled electronic device (e.g., a mobile device coupled to an online service over a wireless network). Responsive to receiving the portion of the voice input, offline or local processing of the portion of the voice input is performed on the voice-enabled electronic device (e.g., by modules 64 and 66) to build at least a portion of a voice action based upon some or all of the voice input. In some implementations, online processing may also be initiated for concurrent processing by an online service, e.g., by forwarding digital audio data or text tokens generated by local voice to text processing to the online service.

Next, in block 156 a determination is made as to whether the voice action is a selectively offline capable voice action. It will be appreciated that block 154 may in some implementations incorporate dynamic building of a voice action using a streaming architecture, so block 156 may be performed prior to completely processing the voice input, while in other implementations, block 156 may not be performed until local processing of the voice input is complete.

As noted above, a determination of whether an action is selectively offline capable may be made in different manners. In some implementations, for example, such a determination may be based upon the type of action requested. In other implementations, such a determination may be based upon a sub-type, based upon one or more parameters of such actions, or in other manners.

If an action is not selectively offline capable, block 156 passes control to block 158 to complete the action, and routine 150 is complete. For example, if an action is always capable of being completed offline, completion of the action may incorporate performing the remainder of the operations needed to complete the action on the device. If an action always requires online connectivity, completion of the action may incorporate communicating with an online service and performing any other local operations needed to completed the action on the device.

If, on the other hand, the action is determined to be selectively offline capable, block 156 passes control to block 160 to determine whether the voice-enabled electronic device is currently offline. If not, and connectivity to an online service exists, the issue of whether an action is selectively offline capable is moot, so control passes to block 158 to complete the action, accessing the online service as needed. If the device is offline, however, block 160 passes control to block 162 to determine whether the selectively offline capable voice action can be completed offline, and if so, passes control to block 158 to complete the action as appropriate.

If not, however, block 162 passes control to block 164 to effectively defer completion of the voice action on the device. As noted above, a selectively offline capable voice action may be determined to be incapable of being completed offline in a number of manners, e.g., based upon a need to retrieve context sensitive data, a need to synchronize with an online service and/or another device, etc. As such, if a voice action can be completed offline, block 162 passes control to block 158 to complete the action as appropriate.

In such a circumstance, block 164 is executed to build the remainder of the voice action as permitted based on the offline status of the device, e.g., to build a voice action object with data for each parameter that can be resolved locally on the device. In implementations where synchronization with an online service or other device is the only operation preventing completion of an action, block 164 may even build a complete voice action object, and effectively perform a local completion, leaving only a remote completion to be performed by the online service or another device once connectivity is restored.

Next, block 166 locally persists data associated with the voice action, e.g., by storing the data locally on the device. In some implementations, for example, the data may include a voice action object, including data for some or all of the parameters associated therewith. Block 168 next waits for a connection to the online service, or for online connectivity to otherwise be restored. Thereafter block 170 communicates with the online service and completes the voice action using the locally persisted data, e.g., by retrieving context sensitive data, by uploading a voice action object or portions thereof to the online service, by synchronizing with the online service or another device, etc. In addition, in some implementations, additional data may be communicated to the online service. For example, in some implementations, diagnostic data associated with a selectively offline capable voice action may be locally persisted and uploaded to the online service in connection with completing the action, and wherein completing the selectively offline capable voice action using the locally persisted data after the voice-enabled electronic device is connected with the online service includes uploading the diagnostic data associated with the selectively offline capable voice action, e.g., data such as navigation logs, error logs, user experience improvement data, action-related data such as action objects and action-related queries, training data, parsing data, voice to text data, etc. Upon completion of block 170, routine 150 is complete.

Now turning to FIGS. 5-9, another example implementation is disclosed for processing voice input in device 50 of FIG. 2 using a streaming architecture. In particular, a number of routines executable by voice action module 58, streaming voice to text module 64 and sematic processor module 66 are disclosed.

Figure 5:
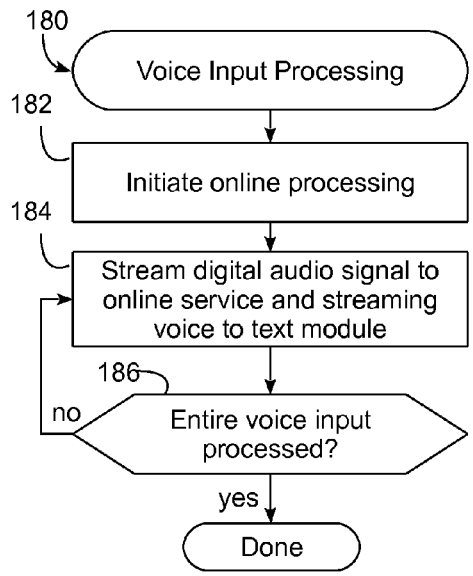
FIG. 5 is a flowchart illustrating another example method of processing a voice input using the environment of FIG. 2.

FIG. 5, for example, illustrates an example voice input processing routine 180 executed by voice action module 58 in response to receipt of at least a portion of a voice input. Routine 180 begins in block 182 by initiating online processing, e.g., by sending a request to the online service, e.g., to voice-based query processor 80 of online search service 54, indicating that a voice unit will be forthcoming from the device. Of note, if no online connectivity exists, block 182 may not result in an online service being notified of the voice input.

Next, in block 184, digital audio data associated with a first portion of the voice input is streamed both to the online service (if connected) and to the offline voice to text module (streaming voice to text module 64). Block 186 determines whether the entire voice input has been processed, and if not, returns control to block 184 to stream additional digital audio data to the online service and to the offline voice to text module. Once the entire voice input has been processed, routine 180 is complete.

It will be appreciated that in some implementations, online processing may be initiated by sending the digital audio data for the first portion of the voice input to the online service, whereby block 182 may omitted. In addition, in some implementations, the rates at which digital audio data is streamed to the online service and to the offline voice to text module may differ, and in some instances, digital audio data may not be streamed to the online service until the entire voice input is received. In still other implementations, voice to text conversion may be performed locally such that rather than streaming digital audio data to the online service, text tokens output by the voice to text module are streamed to the online service.

Figure 6:
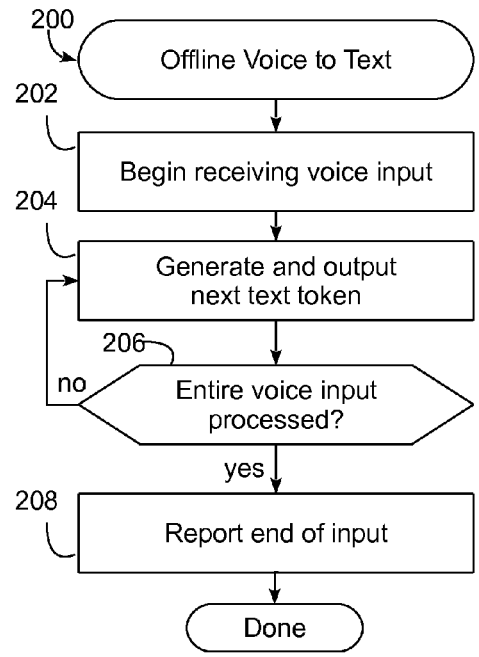
FIG. 6 is a flowchart of an example offline voice to text routine executed by the streaming voice to text module referenced in FIG. 2.

FIG. 6 next illustrates an example offline voice to text routine 200 executed by streaming voice to text module 64. As noted above, module 64 receives digital audio data representative of portions of a voice input from voice action module 58, and as such, routine 200 begins in block 202 by beginning to receive voice input from module 58. Block 204 generates and outputs text tokens (e.g., words and/or phrases) recognized in the digital audio data of the voice input, and block 206 determines whether an entire voice input has been processed, e.g., when no further digital audio data of the voice input remains unprocessed. While more digital audio data remains unprocessed, block 206 returns control to block 204 to generate additional text tokens, and when the entire voice input has been processed, block 206 passes control to block 208 to report the end of the voice input, e.g., to semantic processor module 66. In other implementations, the end of voice input may instead be reported by voice action module 58 or other functionality in the device. Routine 200 is then complete.

Figure 7:
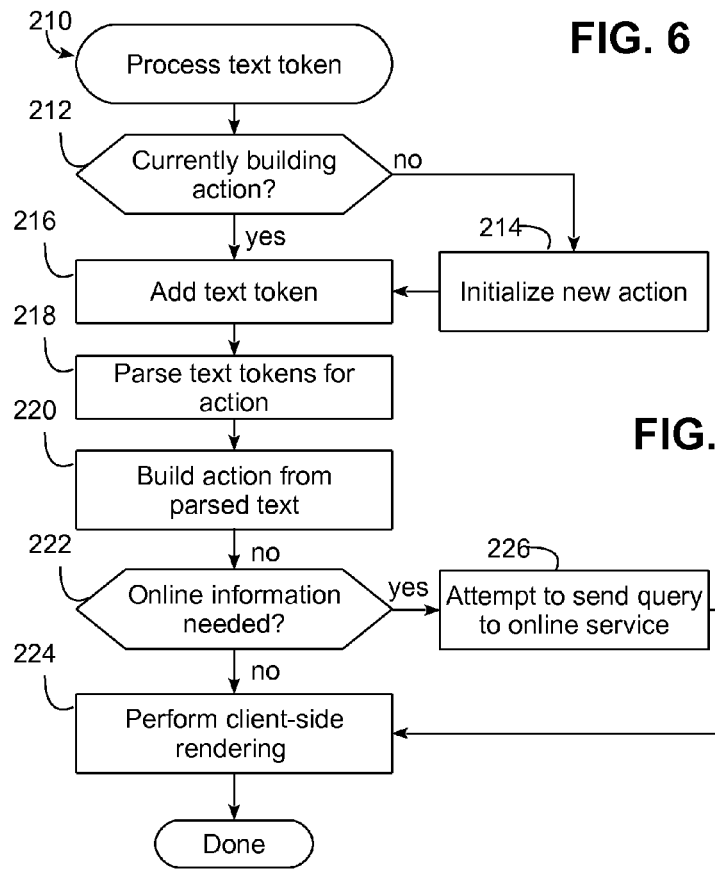
FIG. 7 is a flowchart of an example process text token routine executed by the semantic processor module referenced in FIG. 2.

FIG. 7 next illustrates an example process text token routine 210 executed by semantic processor module 66 in response to receiving a text token from streaming voice to text module 64. Routine 210 begins in block 212 by determining whether module 66 is currently building a voice action. If not, control passes to block 214 to initialize a new action object. After a new action object is initialized in block 214, or if block 212 determines that an action is already currently in the process of being built, block 216 adds the text token to a set of text token associated with the action. Block 218 parses the text tokens for the action and block 220 attempts to build the action from the parsed text. As noted above, in the illustrated implementation a streaming architecture may be employed that attempts to progressively and dynamically build an action based upon the information currently available to the semantic processor module. As such, blocks 218 and 220 in some implementations may build, revise, refine, revise, correct, etc. an action as additional text tokens are supplied to the semantic processor module. Further, blocks 218 and 220 may in some implementations determine what action is being requested, determine the values of one or more parameters for the action, and even determine when additional data may be needed in order to complete the action. For example, if an action is based in part on a location, such as in the case of a request to make a restaurant reservation, blocks 218 and 220 may determine that a list of restaurants near the current location of the device and their availabilities are needed in order to complete the action.

Next, block 222 determines if any online information is needed in order to complete the action (e.g., based upon the aforementioned dynamic building of the action in blocks 218 and 220). If not, control passes to block 224 to perform client-side rendering on the device. For example, client-side rendering may include displaying the text spoken by the user on a display of the device, altering previously-displayed text based upon an update to the partially-built action resulting from the text token being processed, or other audio and/or visual updates as may be appropriate for the particular device. Routine 210 is then complete for that text token.

If block 222 does determine that additional online information is needed, control instead passes to block 226 to attempt to send a query to the online service to request the additional information. Control then passes to block 224 to perform client-side rendering, and routine 210 is complete.

Figure 8:
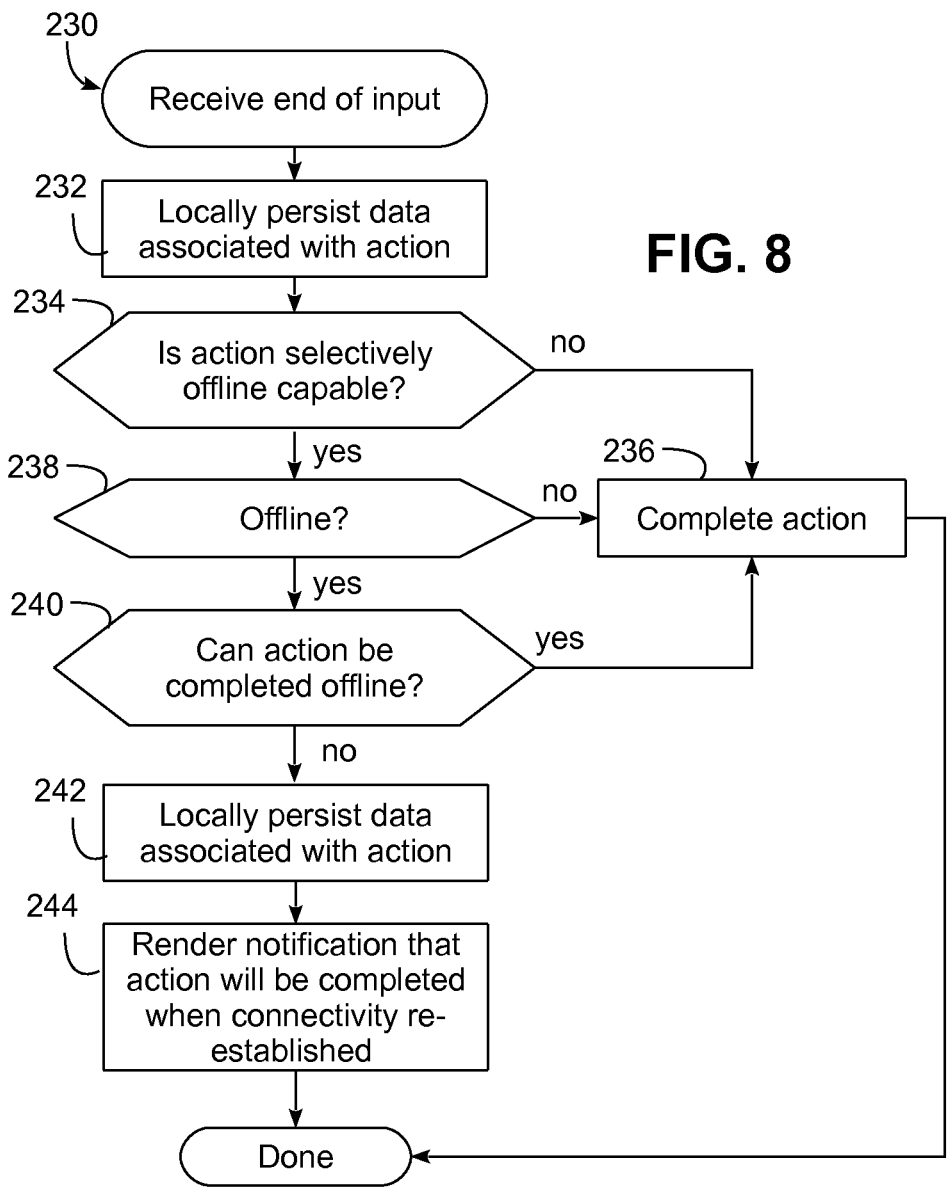
FIG. 8 is a flowchart of an example receive end of input routine executed by the semantic processor module referenced in FIG. 2.

FIG. 8 next illustrates an example receive end of input routine 230 that may be executed by semantic processor module 66 in response to receipt of an end of input indication (e.g., as generated in block 208 of FIG. 6). Routine 230 begins in block 232 by waiting (if necessary) for all text tokens to complete processing by routine 210, indicating that the semantic processor has processed all text tokens for the voice input. Block 234 then determines whether the action is a selectively offline capable voice action.

If the action is not selectively offline capable, block 234 passes control to block 236 to complete the action, and routine 230 is complete. If, on the other hand, the action is determined to be selectively offline capable, block 234 passes control to block 238 to determine whether the voice-enabled electronic device is currently offline. If not, and connectivity to an online service exists, the issue of whether an action is selectively offline capable is moot, so control passes to block 236 to complete the action, accessing the online service as needed. If the device is offline, however, block 238 passes control to block 240 to determine whether the selectively offline capable voice action can be completed offline, and if so, passes control to block 236 to complete the action as appropriate.

If not, however, block 240 passes control to block 242 to effectively defer completion of the voice action on the device. In particular, block 242 locally persists data associated with the voice action, e.g., by storing the data locally on the device. In some implementations, for example, the data may include a voice action object, including data for some or all of the parameters associated therewith. Block 244 then may render a notification to the user indicating that the action will be completed when connectivity is re-established, e.g., by generating a card in some implementations. As one example, if a voice action is to create a reminder, a notification may be displayed on device 50 such as "you are currently offline, and your request to create a reminder to pick up milk will be performed when connectivity is restored." Upon completion of block 244, routine 230 is complete.

Figure 9:
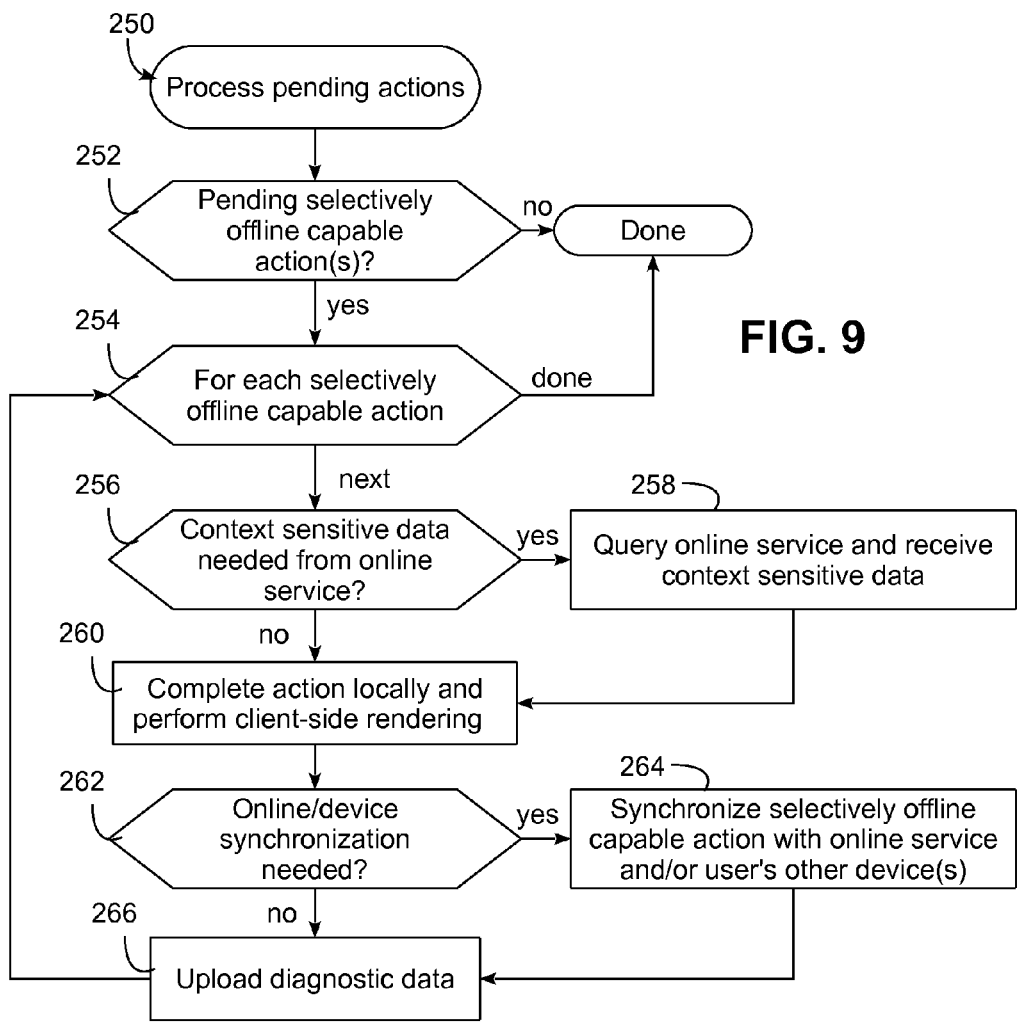
FIG. 9 is a flowchart of an example process pending actions routine executed by the semantic processor module referenced in FIG. 2.

FIG. 9 next illustrates an example process pending actions routine 250 that may be executed by semantic processor module 66 or another module in the voice-enabled electronic device to process any pending voice actions for which data has been locally persisted. Routine 250 may be executed, for example, whenever device 50 establishes a connection to the online service, and as such, routine 250 begins in block 252 by determining whether any pending selectively online capable actions exist. If not, routine 250 terminates; however, if any pending actions exist, control passes to block 254 to initiate a FOR loop to process each pending action.

For each such action, block 254 passes control to block 256 to determine whether any context sensitive data is need from the online service in order to complete the action. If so, control passes to block 258 to query the online service and receive the requested context sensitive data. Control then passes to block 260 to complete the action locally (i.e., perform a local completion) and perform client-side rendering to notify the user (e.g., using a card) that the action has been completed. If not, block 258 is bypassed, and block 256 passes control directly to block 260. An example notification might be "connectivity has been restored, and your reminder to pick up milk has now been created."

Block 260 then passes control to block 262 to determine whether online and/or device synchronization is needed, i.e., whether a remote completion should be performed with the online service or with a user's other devices. If so, control passes to block 264 to perform the synchronization. Control then passes to block 266 to upload diagnostic data associated with the action. If not, block 264 is bypassed and block 262 passes control directly to block 266.

Block 266, which is optional in some implementations, may upload data such as navigation logs, error logs, user experience improvement data, action-related data such as action objects and action-related queries, training data, parsing data, voice to text data, etc. Upon completion of block 266, control returns to block 254 to process additional pending actions, and once all actions are processed, routine 250 is complete.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
receiving a voice input with a voice-enabled electronic device; and
in the voice-enabled electronic device, and responsive to receiving at least a portion of the voice input:
performing local processing of the at least a portion of the voice input, wherein the local processing identifies that the voice input is associated with a selectively offline capable voice action and builds at least a portion of the selectively offline capable voice action, and wherein the local processing identifies that the voice input is associated with the selectively offline capable voice action by identifying that the voice input is associated with a voice action that is of a type that in at least one instance is capable of being completed offline and in at least one other instance can only be completed using a connection with an online service because a parameter for the voice action is unresolvable strictly based upon data provided in the voice input and/or data available locally on the voice-enabled device;
determining during the local processing and when the voice-enabled electronic device is offline whether the selectively offline capable voice action can be completed offline, wherein determining whether the selectively offline capable voice action can be completed offline includes determining during the local processing whether the selectively offline capable voice action includes at least one parameter that remains unresolved from the voice input;

in response to determining that the selectively offline capable voice action can be completed offline, completing the selectively offline capable voice action with the local processing; and in response to determining that the selectively offline capable voice action cannot be completed offline:

locally persisting data generated by the local processing for the selectively offline capable voice action; and completing the selectively offline capable voice action using the locally persisted data after the voice-enabled electronic device is connected with the online service, including retrieving a value for the at least one parameter from the online service and, after retrieving the value from the online service, locally completing the selectively offline capable voice action using the locally persisted data and the retrieved value.

2. The method of claim 1, wherein the voice-enabled electronic device comprises a mobile device configured to communicate with the online service when in communication with a wireless network.

3. The method of claim 1, wherein performing the local processing dynamically builds the at least a portion of the offline capable voice action prior to completely receiving the voice input with the voice-enabled electronic device, and wherein determining during the local processing and when the voice-enabled electronic device is offline whether the selectively offline capable voice action can be completed offline is performed prior to completely receiving the voice input with the voice-enabled electronic device.

4. The method of claim 1, wherein completing the selectively offline capable voice action using the locally persisted data after the voice-enabled electronic device is connected with the online service includes retrieving context sensitive data from the online service and completing the selectively offline capable voice action using the context sensitive data.

5. The method of claim 4, wherein completing the selectively offline capable voice action using the locally persisted data after the voice-enabled electronic device is connected with the online service includes issuing a query to the online service for the context sensitive data.

6. The method of claim 5, wherein the offline capable voice action includes at least one location sensitive parameter, wherein the query includes a current location of the voice-enabled electronic device, and wherein the context sensitive data includes location sensitive data.

7. The method of claim 1, wherein completing the selectively offline capable voice action using the locally persisted data after the voice-enabled electronic device is connected with the online service includes synchronizing the voice-enabled electronic device with the online service after performing the local completion.

8. The method of claim 1, wherein completing the selectively offline capable voice action using the locally persisted data after the voice-enabled electronic device is connected with the online service includes synchronizing the voice-enabled electronic device with at least one other electronic device associated with the user of the voice-enabled electronic device after performing the local completion.

9. The method of claim 1, wherein locally persisting data generated by the local processing for the selectively offline capable voice action includes locally persisting diagnostic data associated with the selectively offline capable voice action, and wherein completing the selectively offline capable voice action using the locally persisted data after the voice-enabled electronic device is connected with the online service includes uploading the diagnostic data associated with the selectively offline capable voice action.

10. The method of claim 1, further comprising, in response to determining that the selectively offline capable voice action cannot be completed offline, performing a local completion of the selectively offline capable voice action on the voice-enabled electronic device, wherein completing the selectively offline capable voice action using the locally persisted data after the voice-enabled electronic device is connected with the online service includes performing a remote completion of the selectively-offline capable voice action with the online service.

11. The method of claim 1, further comprising, in response to determining that the selectively offline capable voice action cannot be completed offline, notifying a user of the voice-enabled electronic device that the selectively offline capable voice action will be completed after the voice-enabled electronic device is connected with the online service.

12. The method of claim 11, further comprising, in response to determining that the selectively offline capable voice action cannot be completed offline, notifying the user of the voice-enabled electronic device that the selectively offline capable voice action has been completed after the voice-enabled electronic device has connected with the online service.

13. The method of claim 1, wherein the type of the selectively offline capable voice action is selected from the group consisting of a reminder type, a communication type, an event type, a device setting type, a media control type and a navigation type.

14. An apparatus including memory and one or more processors operable to execute instructions stored in the memory, comprising instructions to:

receive a voice input with a voice-enabled electronic device; and in the voice-enabled electronic device, and responsive to receiving at least a portion of the voice input:

perform local processing of the at least a portion of the voice input, wherein the local processing identifies that the voice input is associated with a selectively offline capable voice action and builds at least a portion of the selectively offline capable voice action, and wherein the local processing identifies that the voice input is associated with the selectively offline capable voice action by identifying that the voice input is associated with a voice action that is of a type that in at least one instance is capable of being completed offline and in at least one other instance can only be completed using a connection with an online service because a parameter for the voice action is unresolvable strictly based upon data provided in the voice input and/or data available locally on the voice-enabled device;

determine during the local processing and when the voice-enabled electronic device is offline whether the selectively offline capable voice action can be completed offline, wherein the instructions to determine whether the selectively offline capable voice action can be completed offline includes instructions to determine during the local processing whether the selectively offline capable voice action includes at least one parameter that remains unresolved from the voice input;

in response to a determination that the selectively offline capable voice action can be completed offline, complete the selectively offline capable voice action with the local processing; and in response to determining that the selectively offline capable voice action cannot be completed offline:
locally persist data generated by the local processing for the selectively offline capable voice action; and
complete the selectively offline capable voice action using the locally persisted data after the voice-enabled electronic device is connected with the online service, including instructions to retrieve a value for the at least one parameter from the online service and, after retrieving the value from the online service, locally complete the selectively offline capable voice action using the locally persisted data and the retrieved value.

15. The apparatus of claim 14, wherein the instructions include:
first instructions implementing a streaming voice to text module that converts a digital audio signal of the voice input to text, wherein the first instructions dynamically generate a plurality of text tokens from the digital audio signal; and
second instructions implementing a streaming semantic processor that dynamically builds the portion of the selectively offline capable voice action from at least a portion of the plurality of text tokens.

16. The apparatus of claim 14, wherein the instructions that complete the selectively offline capable voice action using the locally persisted data after the voice-enabled electronic device is connected with the online service include instructions that retrieve context sensitive data from the online service and complete the selectively offline capable voice action using the context sensitive data.

17. The apparatus of claim 14, wherein the instructions that complete the selectively offline capable voice action using the locally persisted data after the voice-enabled electronic device is connected with the online service include instructions that synchronize the voice-enabled electronic device with an online service or with at least one other electronic device associated with the user of the voice-enabled electronic device.

18. The apparatus of claim 14, further comprising instructions that, in response to determining that the selectively offline capable voice action cannot be completed offline, perform a local completion of the selectively offline capable voice action on the voice-enabled electronic device, and wherein the instructions that complete the selectively offline capable voice action using the locally persisted data after the voice-enabled electronic device is connected with the online service include instructions that perform a remote completion of the selectively-offline capable voice action with the online service.

19. A non-transitory computer readable storage medium storing computer instructions executable by one or more processors to perform a method comprising:

receiving a voice input with a voice-enabled electronic device; and in the voice-enabled electronic device, and responsive to receiving at least a portion of the voice input:

performing local processing of the at least a portion of the voice input, wherein the local processing identifies that the voice input is associated with a selectively offline capable voice action and builds at least a portion of the selectively offline capable voice action, and wherein the local processing identifies that the voice input is associated with the selectively offline capable voice action by identifying that the voice input is associated with a voice action that is of a type that in at least one instance is capable of being completed offline and in at least one other instance can only be completed using a connection with an online service because a parameter for the voice action is unresolvable strictly based upon data provided in the voice input and/or data available locally on the voice-enabled device;

determining during the local processing and when the voice-enabled electronic device is offline whether the selectively offline capable voice action can be completed offline, wherein determining whether the selectively offline capable voice action can be completed offline includes determining during the local processing whether the selectively offline capable voice action includes at least one parameter that remains unresolved from the voice input;

in response to determining that the selectively offline capable voice action can be completed offline, completing the selectively offline capable voice action with the local processing; and in response to determining that the selectively offline capable voice action cannot be completed offline:

locally persisting data generated by the local processing for the selectively offline capable voice action; and completing the selectively offline capable voice action using the locally persisted data after the voice-enabled electronic device is connected with the online service, including retrieving a value for the at least one parameter from the online service and, after retrieving the value from the online service, locally completing the selectively offline capable voice action using the locally persisted data and the retrieved value.

* * * * *